US007912522B2

(12) United States Patent  
Pierson (10) Patent No.: US 7,912,522 B2  
(45) Date of Patent: Mar. 22, 2011

(54) METHODS AND APPARATUS FOR CARRYING AND USING A HAND-HELD TELEPHONE

(75) Inventor: Cyndy Pierson, Salinas, CA (US)

(73) Assignee: Sound Starts, Inc., Aromas, CA (US)

( * ) Notice: Subject to any disclaimer, the term of this patent is extended or adjusted under 35 U.S.C. 154(b) by 695 days.

(21) Appl. No.: 11/947,485

(22) Filed: Nov. 29, 2007

(65) Prior Publication Data

US 2009/0141886 A1    Jun. 4, 2009

(51) Int. Cl.  
*H04M 1/02*    (2006.01)
(52) U.S. Cl. .................... 455/575.3; 379/449
(58) Field of Classification Search .... 455/575.1–575.8; 361/679.01–679.61  
See application file for complete search history.

(56) References Cited

U.S. PATENT DOCUMENTS

| | | | | |
|---|---|---|---|---|
| 6,330,430 | B1* | 12/2001 | Jensfelt | 455/575.8 |
| 7,099,710 | B1* | 8/2006 | Faillance | 455/575.8 |
| 2003/0143961 | A1* | 7/2003 | Humphreys et al. | 455/90 |
| 2004/0029623 | A1* | 2/2004 | Ellis et al. | 455/575.8 |
| 2004/0035151 | A1* | 2/2004 | Morkenborg | 63/21 |
| 2004/0166910 | A1* | 8/2004 | Ha et al. | 455/575.8 |
| 2004/0206796 | A1* | 10/2004 | Badillo et al. | 224/577 |
| 2005/0127123 | A1* | 6/2005 | Smithers | 224/610 |
| 2006/0124676 | A1* | 6/2006 | Mastrosimone | 224/257 |
| 2006/0183518 | A1* | 8/2006 | Emano | 455/575.8 |
| 2007/0060224 | A1* | 3/2007 | Liu | 455/575.8 |
| 2007/0169382 | A1* | 7/2007 | Bongard | 36/136 |
| 2007/0293288 | A1* | 12/2007 | Lin et al. | 455/575.8 |
| 2008/0096620 | A1* | 4/2008 | Lee et al. | 455/575.8 |
| 2008/0214252 | A1* | 9/2008 | Oten et al. | 455/575.8 |

* cited by examiner

*Primary Examiner* — Kent Chang  
*Assistant Examiner* — Kashif Siddiqui  
(74) *Attorney, Agent, or Firm* — Donal R. Boys; Central Coast Patent Agency, Inc.

(57) ABSTRACT

A system for securing a hand-held phone having a base with a keypad to be suspended from a lanyard around a person's neck has a support panel having a length and a width, a front side and a back side, and an opening near one end of the length, an elongate strip of material joined to the support panel at two lateral edges, forming a loop, a pliable, transparent window substantially centered in the strip of material, and a lanyard attached to the opening in the support panel. The hand-held phone is suspended from the lanyard by inserting a base of the phone in the loop with the pliable, transparent window overlying the keypad of the phone.

7 Claims, 7 Drawing Sheets

METHODS AND APPARATUS FOR CARRYING AND USING A HAND-HELD TELEPHONE

CROSS-REFERENCE TO RELATED APPLICATIONS

NA

BACKGROUND OF THE INVENTION

1. Field of the Invention

The present invention is in the field of accessories for mobile hand sets and pertains particularly to methods and apparatus for securing a hand-held telephone for suspension from a lanyard.

2. Discussion of the State of the Art

The hand-held telephone is arguably the primary telephone communications device used by most people today. Many consumers use mobile hand-held telephones in place of land-line telephones at home and at the office. One problem with using wireless hand-helds is that often they are misplaced, left in cars, left at home, or otherwise, because of misplacement, are not readily available to the user to place or receive telephone calls.

The aftermarket industry including manufacturers of hand-held cellular phones address this issue by providing a standard hand-held case made from leather, cloth or other materials designed to attach to a consumers belt or to be clipped onto a user's pocket, purse lip, or onto some other stationary apparatus or article of clothing. Typically speaking, the case has cut-outs for access to ear phone jacks, charging ports, USB ports or the like and is typically provided for a specific model of telephone.

In some cases, the hand-held must be removed from the case to use the phone. Often removing the telephone is difficult because of a tight fitting case and often the telephone inadvertently gets answered or buttons are inadvertently pressed while the phone is still inside the case. In other cases, the telephone may be operated while enclosed within the case via a cutout for the telephone's operating panel or phone pad.

A particular problem with telephone-carrying apparatus in the art is women's wear. Men have belts and pockets. Much of women's clothing does not. Particularly clothing favored by professional women and business women has no place for a cellular telephone It has occurred to the inventor that one way to secure a hand-held telephone so that it is rarely misplaced is to secure the telephone directly to an appendage of the user's body as one might secure an ornament like a necklace or bracelet. It has also occurred to the inventor that architecture might be conceived for a phone case that is easier to use, and particularly suited to professional and business women. Therefore, what is clearly needed is a secure and simple system for securing a hand-held cellular telephone in a suspended state that may be easily operated and that enables use of the telephone while the phone is suspended by the system.

SUMMARY OF THE INVENTION

In an embodiment of the invention a system for securing a hand-held phone having a base with a keypad to be suspended from a lanyard around a person's neck is provided, comprising a support panel having a length and a width, a front side and a back side, and an opening near one end of the length, an elongate strip of material joined to the support panel at two lateral edges, forming a loop, a pliable, transparent window substantially centered in the strip of material, and a lanyard attached to the opening in the support panel. The system is characterized in that the hand-held phone is suspended from the lanyard by inserting a base of the phone in the loop with the pliable, transparent window overlying the keypad of the phone.

In one embodiment the hand-held phone is a wireless cellular flip-phone having a lid hinged to the phone base. Also in one embodiment the loop is formed by fastening the loop material to the panel at one end with a connector system that can be opened, so the loop may be opened to insert the phone, and closed over the base of the phone and fastened. The connector system may be a hook and loop fastener system or a snap fastener system.

In some embodiments the lanyard may include memory clips folded over the lanyard material. The lanyard may be adjustable to lengthen or shorten the lanyard.

In some embodiments there may be one or more pockets on the backside of the panel of a size for storing one or more items including one or more of credit cards, bank cards, identity cards, or driver's license.

DETAILED DESCRIPTION

The inventor provides an apparatus and associated method for securing a hand-held telephone, such as a flip phone, from a lanyard designed to enable a user to wear the phone around the neck and to operate the phone without removing the lanyard. In one embodiment, a flip phone jacket is used while in another aspect a simple cinching device may be used with or without the jacket. The present invention is described in detail in the following examples.

Figure 1:
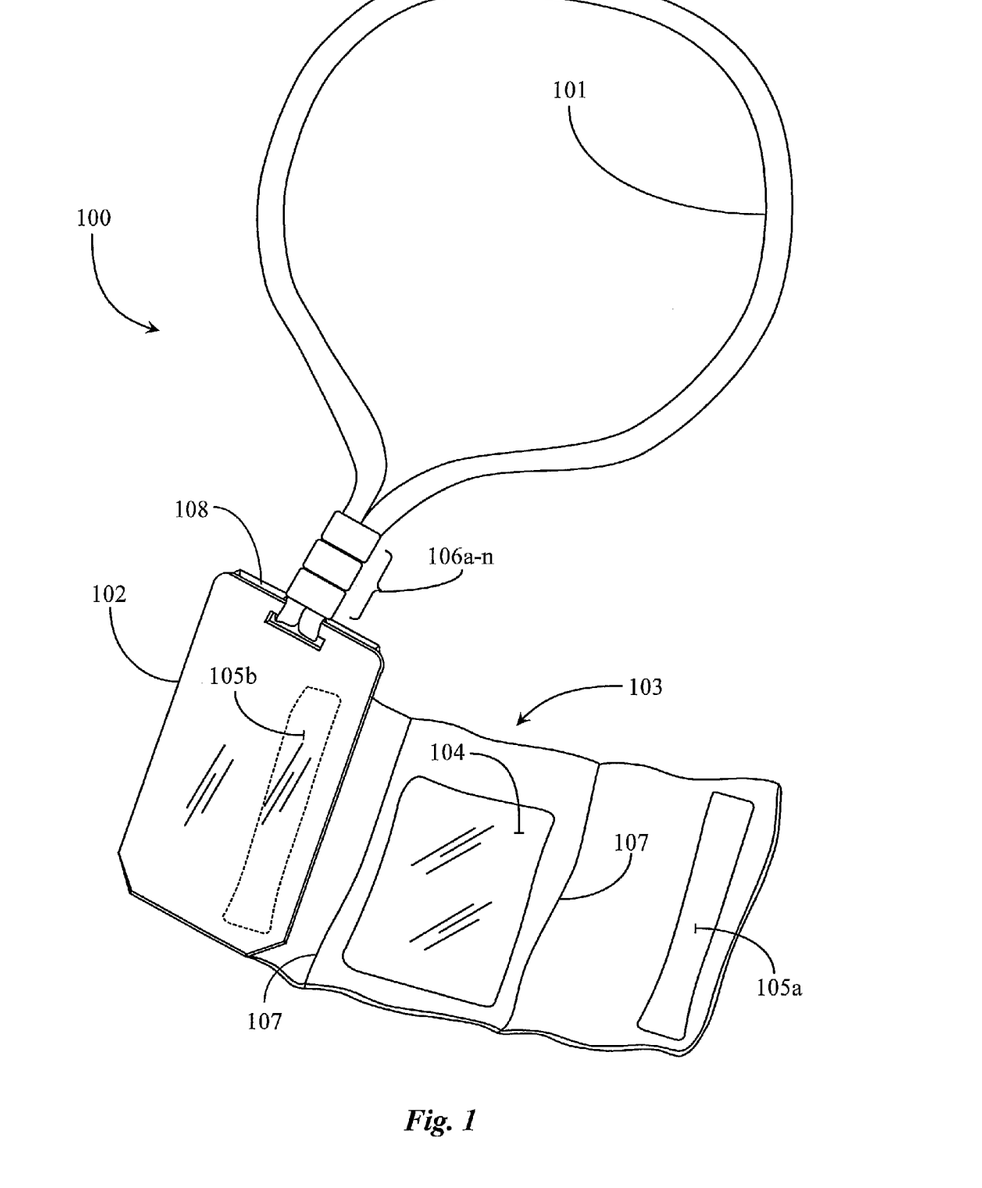
FIG. 1 is a perspective view of a system for securely suspending a flip phone according to an embodiment of the present invention.

FIG. 1 is a perspective view of a system 100 for securely suspending a flip phone from a lanyard according to an embodiment of the present invention. System 100 includes a lanyard 101 secured to a support panel 102. Lanyard 101 may be fashioned from any pliable tether or elongated strip of material like leather, nylon, cordura, cotton, rope, twine, or nearly any other type of material fashionable into a loop for the purposes of making the lanyard. In one embodiment, lanyard 101 may further be of chain link, bead chain, or another type of metallic or plastic chain such as woven chain or a chain made of metallic sections or segments similar to a watch band.

Lanyard 101 is adapted to be worn about the neck by a user and therefore may be made adjustable such that a user may tighten or loosen the lanyard while it is in position about the user's neck. In this example, lanyard 101 is fastened to support panel 102 at an opening substantially centered and near the top edge of the panel. Memory clips 106a-n in some embodiments may be used as ornaments, ad may carry such as ornaments or initials.

By memory clips, it is meant that each clip has some remembrance insignia or other visual indicator of some past event that might be important to the user. Therefore, each memory clip carries some sentimental value to the user, much as is known for such as charm bracelets, for example. This is not required in order to practice the invention, but may be implemented to lend significance to the lanyard by personalizing the system to the user who owns it. Other fasteners may be used besides clips such lanyard beads, snaps, or the like.

Support panel 102 is generally rectangular in shape in this embodiment, thin, and has in this example the corners rounded to eliminate sharp edges. Panel 102 may assume other geometric shapes without departing from the spirit and scope of the invention, but is preferably of the size and geometry of a footprint of the telephone it is meant to carry. So the determination of the shape of panel 102 rests partly on the profile of the telephone that the panel will underlie in use. The surface area of panel 102 may be substantially similar to the surface area of the back of a telephone that system 100 is designed for. Support panel 102 serves as a support base for an elongated flap of material 103 having two or more folds or seams 107 provided to enable the material to be folded at those seams around support plate 102 enclosing a of a telephone, particularly a flip-phone.

Material of 103 may be cordura, nylon, cotton, jean material, or some plastic hybrid material, among other suitable materials, such as pliable plastic. The folds or seams 107 in material 103 define three separate material sections. A first or back section is attached to the back surface of support plate 102 by gluing in this example. The first seam 107 extends past the edge of plate 102 a distance to facilitate the thickness of the base of a flip phone that material 103 is designed to enclose once it is wrapped around the flip phone base.

A hook or loop section 105b of a hook and loop connection (105a, 105b) is sewn onto the back of material 103 opposite the side that is attached to the rear of support plate 102. A middle section of material 103 defined by seams 107 on either side has a clear plastic window 104. Window 104 may be formed in the material 103 in several different ways. In one embodiment, window 104 is sewn over a cut-out opening. Window 104 is designed to fit over the key-pad or phone pad buttons on the flip phone the material is wrapped around. Plastic 104 is pliable and soft enough to enable tactile manipulation of the individual keys of the key-pad. In this way a user may operate the flip phone while it is secured by the jacket formed by material 103.

The last material section has a hook or loop connector 105a sewn onto it on the side that, when wrapped, will interface with the side supporting connector 105b. It is not important which connector 105a or 105b is hook or loop. Using system 100, a user may suspend a flip phone about the neck by simply presenting the phone in a vertical position against support panel 102 and wrapping material 103 about the phone base with window 104 substantially aligning with the key-pad of the phone. In one embodiment system 100 is made specifically for a certain type or brand of flip phone. However, it is possible that one system 100 will work with more than one type or brand of phone.

Figure 2:
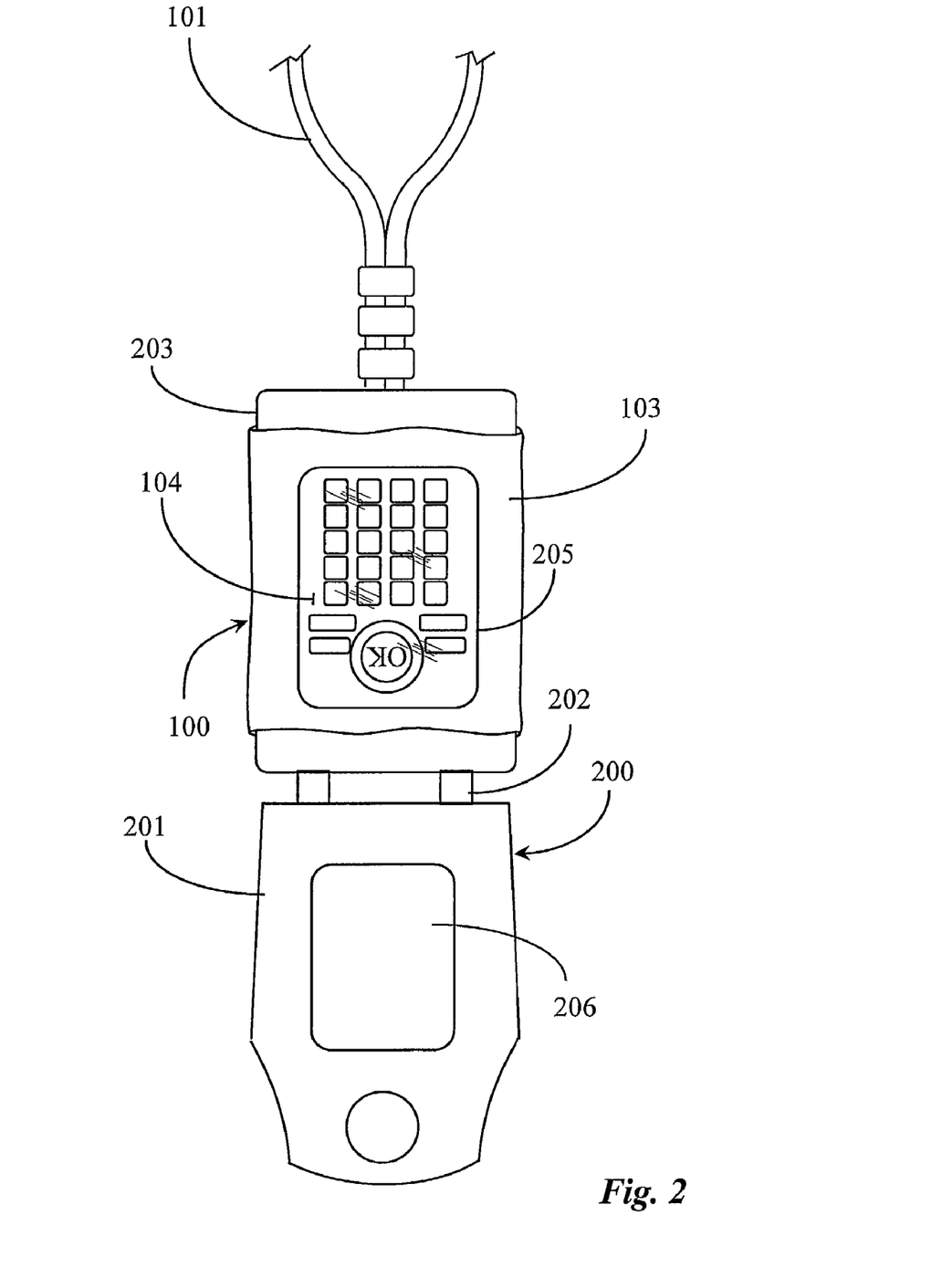
FIG. 2 is a front view of the system of FIG. 1 wrapped around the body of a flip phone.

FIG. 2 is a front view of the system 100 of FIG. 1 wrapped around the body of a flip phone 200. Flip Phone 200 includes a phone base 203 and a flip lid 201 joined to base 203 via a hinge 202. Flip phone 200 has a phone key pad 205 among other possible features and a display 206. In this view, material 103 is fully wrapped around and is enclosing or jacketing phone base 203. Lid 201 is opened to enable the user to operate the phone by manipulating buttons on key pad 205 through window 104, which is translucent or clear in a preferred embodiment. System 100 is designed and constructed so flip phone 203 is carried upside down when suspended from lanyard 101, so that when a user takes the telephone in hand and turns it up to use, the telephone is in the proper position for use.

The physical area of flip phone 200 covers the support panel 102 completely in this view. A user may wear the phone via lanyard 101 or may hang the phone on a hook or in some convenient proximity if not being worn. The user may operate the phone at least for the purpose of making and receiving telephone calls. In one embodiment, there are cut-outs in material 103 sufficient to align over ear jacks, USB ports, or other normally accessible features that may be found on one or both sides of flip phone 200. The bottom portion of the phone base, which may include a charging port, is unobstructed.

The tautness of the wrap of material 103 around phone 200 is sufficient to keep the phone from slipping down and out of the formed jacket. Closing lid 201 is not required to retain the phone into the formed jacket. The user may lift and close lid 201 at will without affecting retention of the phone within the formed jacket.

In an alternative embodiment material 103 is joined to panel 102 in a way to form a loop such that the flip phone base 203 may be inserted in the loop without having to wrap the material around the phone base and fasten it in the back, and to have the plastic window in place over the phone keyboard.

In yet another embodiment a pocket 108 is formed on the back of panel 102 as a repository for such as credit or bank cards, identification, license, and the like. Such a pocket may also be provided inside the panel, rather than on the outside, for additional security. With these embodiments a woman need not carry a purse or wallet, and can have necessary items at hand at all times. There may also be a pocket with a closure, such as a zipper, for change and paper money. There may be other attachments, such a lipstick holder. There may also be a keychain.

Figure 3:
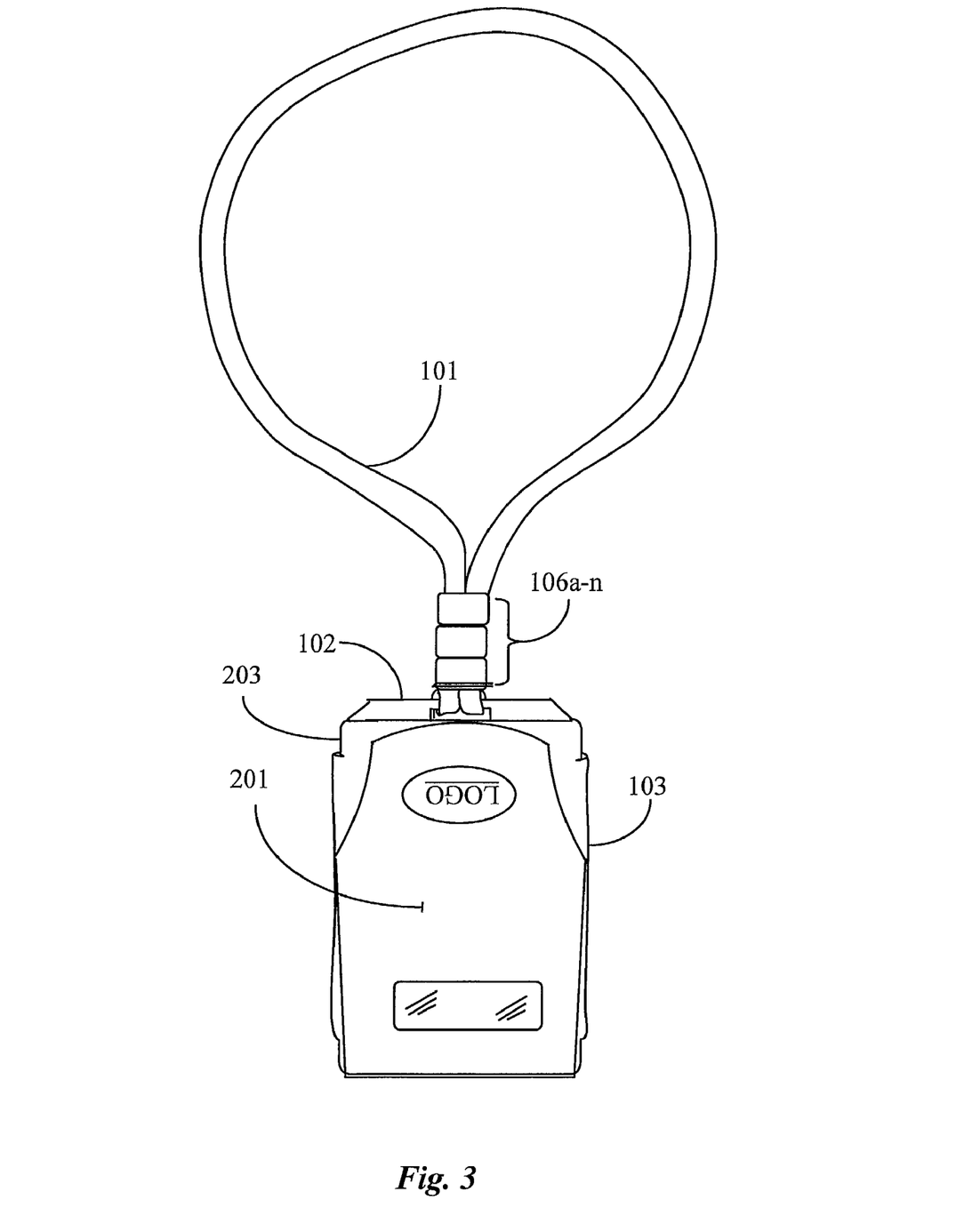
FIG. 3 is a front view of the system of FIGS. 1 and 2 with the phone closed and suspended by the system.

FIG. 3 is a front view of system 100 of FIGS. 1 and 2 with phone 200 closed and suspended by the system. Phone 200 is shown suspended from lanyard 101. Lid 201 may be opened and closed about hinge 202 to make and receive calls or to disconnect calls without affecting the state of suspension of the phone. For example, a user may operate phone 200 while it is hanging around the user's neck via lanyard 101. In this example, the top portion of plate 102 and memory clips 106a-n are readily visible with the lid 201 of phone 200 closed.

Figure 4:
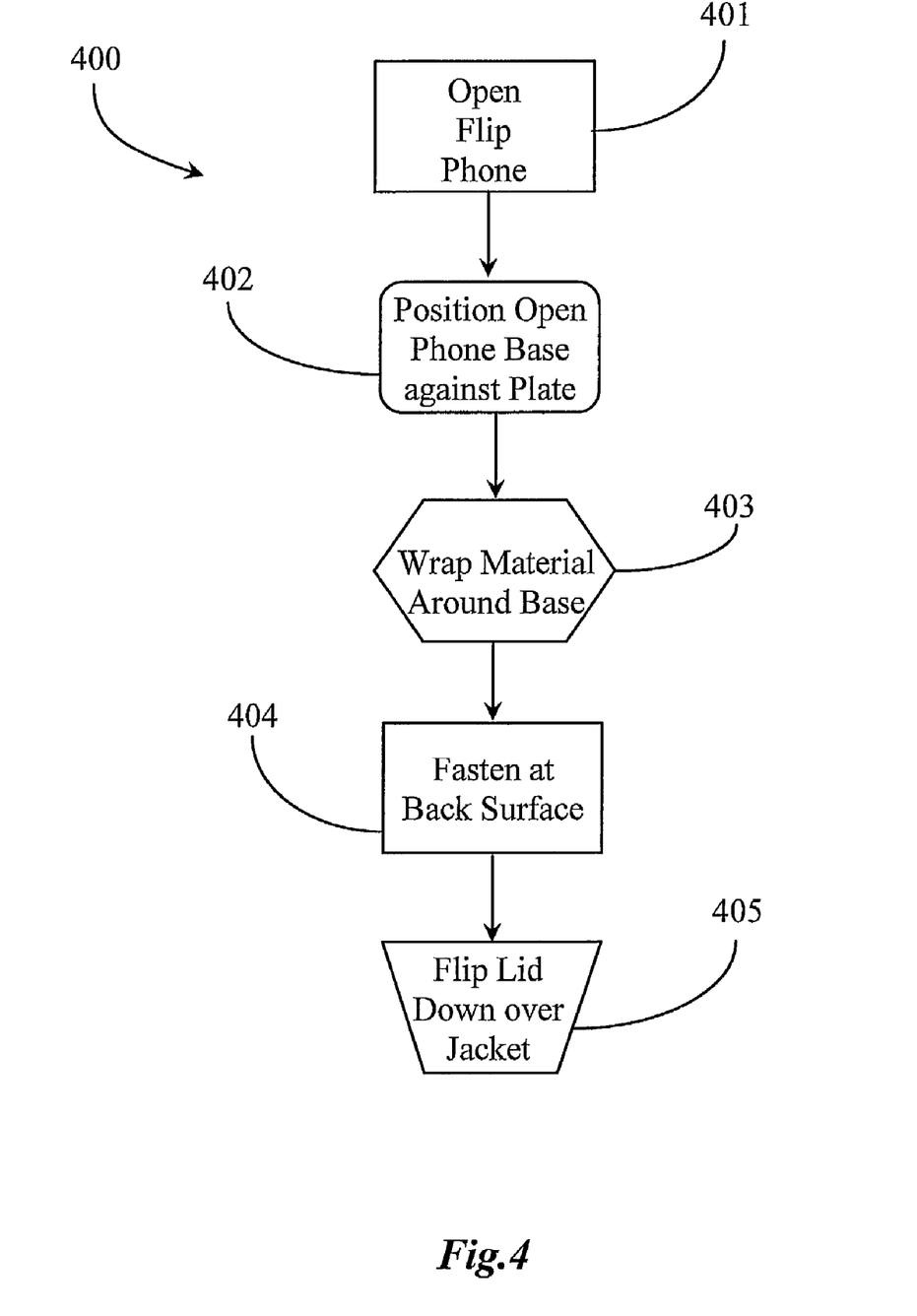
FIG. 4 is a process flow chart illustrating steps for suspending a flip phone using the system of FIGS. 1-3.

FIG. 4 is a process flow chart illustrating steps 400 for suspending a flip phone using the system of FIGS. 1-3. At step 401, a user with a flip phone opens the phone. At step 402, the user positions the open phone base against the support plate of the system on the side opposite of where the material is attached.

At step 403, the user wraps the material around the base of the phone while holding the phone in place against the support plate. At step 404, the user fastens the hook and loop connection securing the material wrap in place around the phone base. In this step the window in the last fold of the material aligns over the key-pad on the phone base.

At step 405, the user flips the lid of the phone down closing the phone. The user may wear the phone using the lanyard described further above such as by placing the lanyard, the phone suspended there from around the user's neck for example. In one embodiment, the hook and loop connection is replaced by a button or snap connection.

Figure 5:
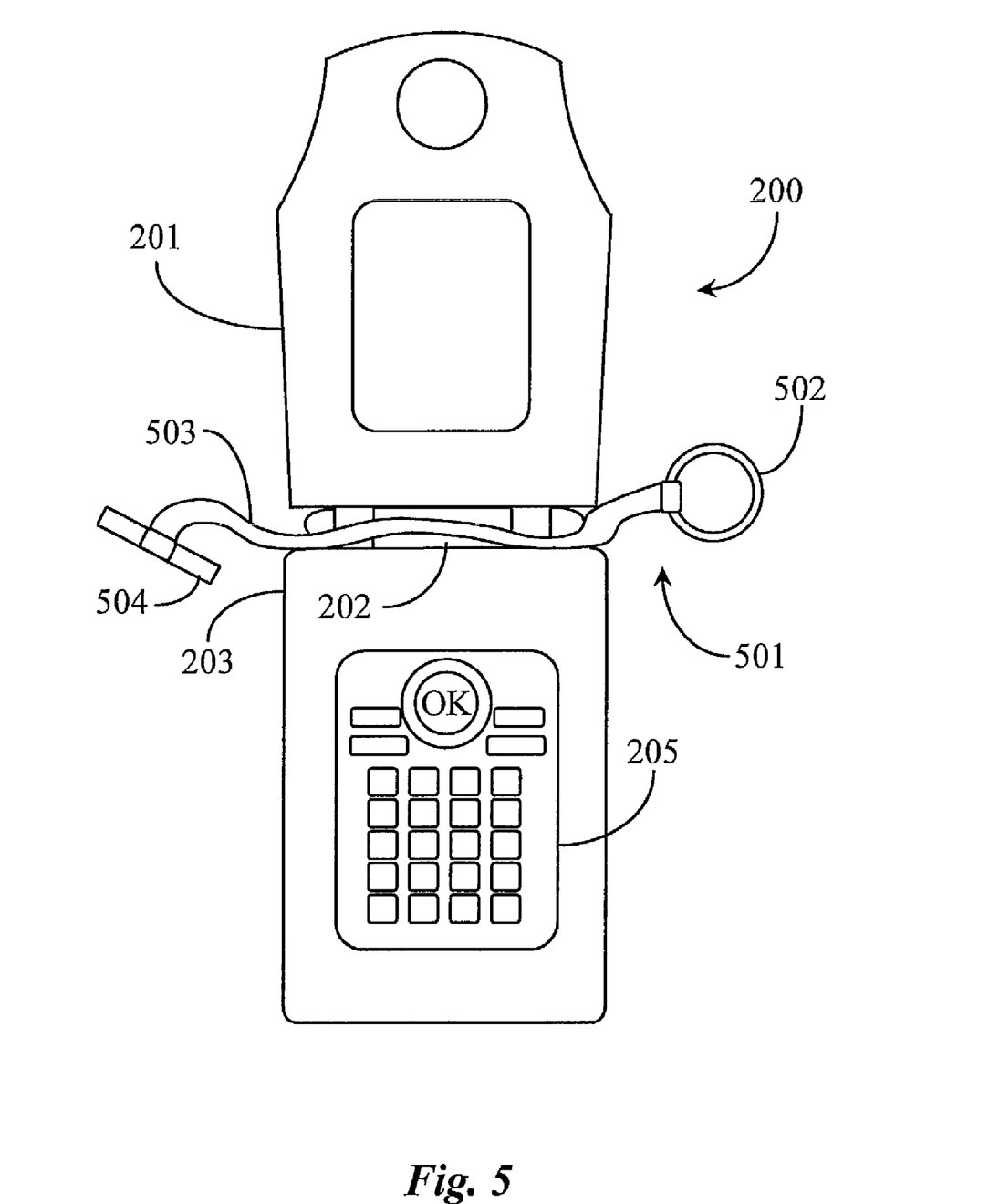
FIG. 5 is a front view of a cinching device for suspending a flip phone according to another embodiment of the present invention.

FIG. 5 is a front view of a cinching device 501 for suspending a flip phone according to another embodiment of the present invention. In this embodiment, a material jacket and support plate are not required to suspend the telephone from a lanyard, for example. In this example, a cinching device 501 is provided. Cinching device 501 is illustrated in a position lying across phone 200 substantially along the axis of hinge 202.

Cinching device 501 includes a tether 503. Tether 503 like lanyard 101 described further above may be of any type of tether material or material strip provided in sufficient length to cinch the phone about the hinge area of the phone.

Cinching device 501 has a hoop 502 tied or otherwise fastened at one end of the tether and a cinch bar 504 tied or otherwise attached to the end opposite the attached hoop. Bar 504 and hoop 502 may be formed of plastic or some metallic material like aluminum, cooper, brass, silver, or some other ornate metal. Hoop 502 is of a diameter less than the overall length of bar 504.

Phone 200 includes key-pad 205, phone base 203 and lid 201. Because only the cinching device 501 is used to suspend the phone, no other materials are required. In use, bar 504 is brought through hoop 502 linearly or in line with the axis of the hoop and then pulled back out in a lateral position relative to the hoop diameter preventing the bar from coming back through under tension. This action is performed about the hinge laterally to suspend the phone with the flip lid closed. Flip phone 200 is illustrated in an open position ready to accept cinching device 501 laid out roughly parallel to the hinge 202. Hoop 502 and bar 504 in one embodiment, may be ornately designed as opposed to strict conformance to a hoop and bar geometry.

Figure 6:
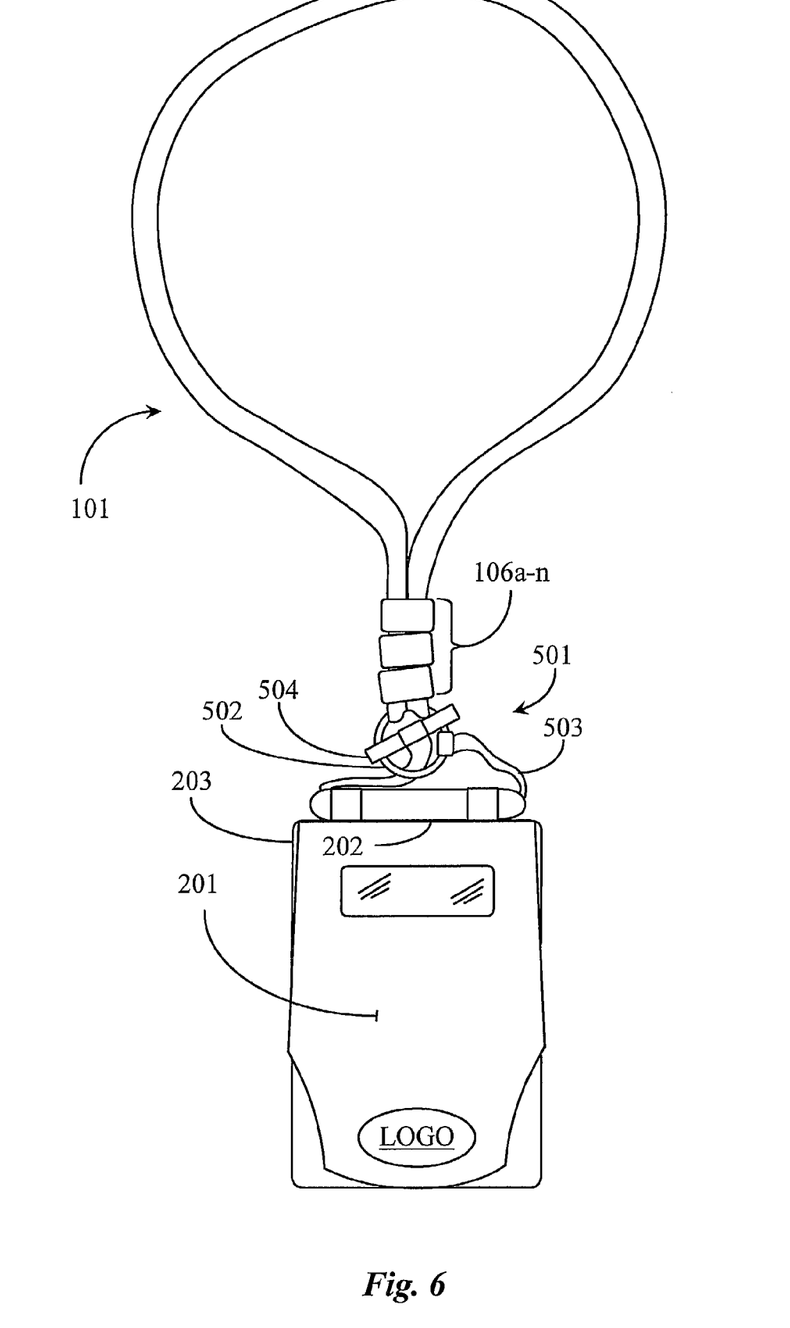
FIG. 6 is a front view of a flip phone suspended from a lanyard using the cinch device of FIG. 5.

FIG. 6 is a front view of flip phone 200 suspended from lanyard 101 using the cinching device of FIG. 5. Cinching device 501 is shown closed about the hinge 202 of phone 200 with the lid 201 closed. Lanyard 101 may be tied or otherwise fastened directly to hoop 502 of device 501. Bar 504 and tether 503 are visible in this example. With lid 201 closed against phone base 203 and the cinching device 501 applied, the phone may be suspended from a lanyard like lanyard 101 and worn safely about a user's neck as was described with respect to the material embodiment further above. In this embodiment the telephone is not suspended upside down, but right side up.

In one embodiment using a hoop that is ornate, lanyard 101 may be attached to the hoop in a number of ways. In this example, the telephone may be suspended safely while closed. A user may open phone 200 to make and receive telephone calls while it is cinched in the manner described however, opening the lid to 180 degrees from the base may allow the cinch loop formed by tether 503 to slip out. The phone may still be operated while suspended from the lanyard in this way using cinching device 501 as long as care is used while operating the phone by maintaining tension on the cinching device.

Figure 7:
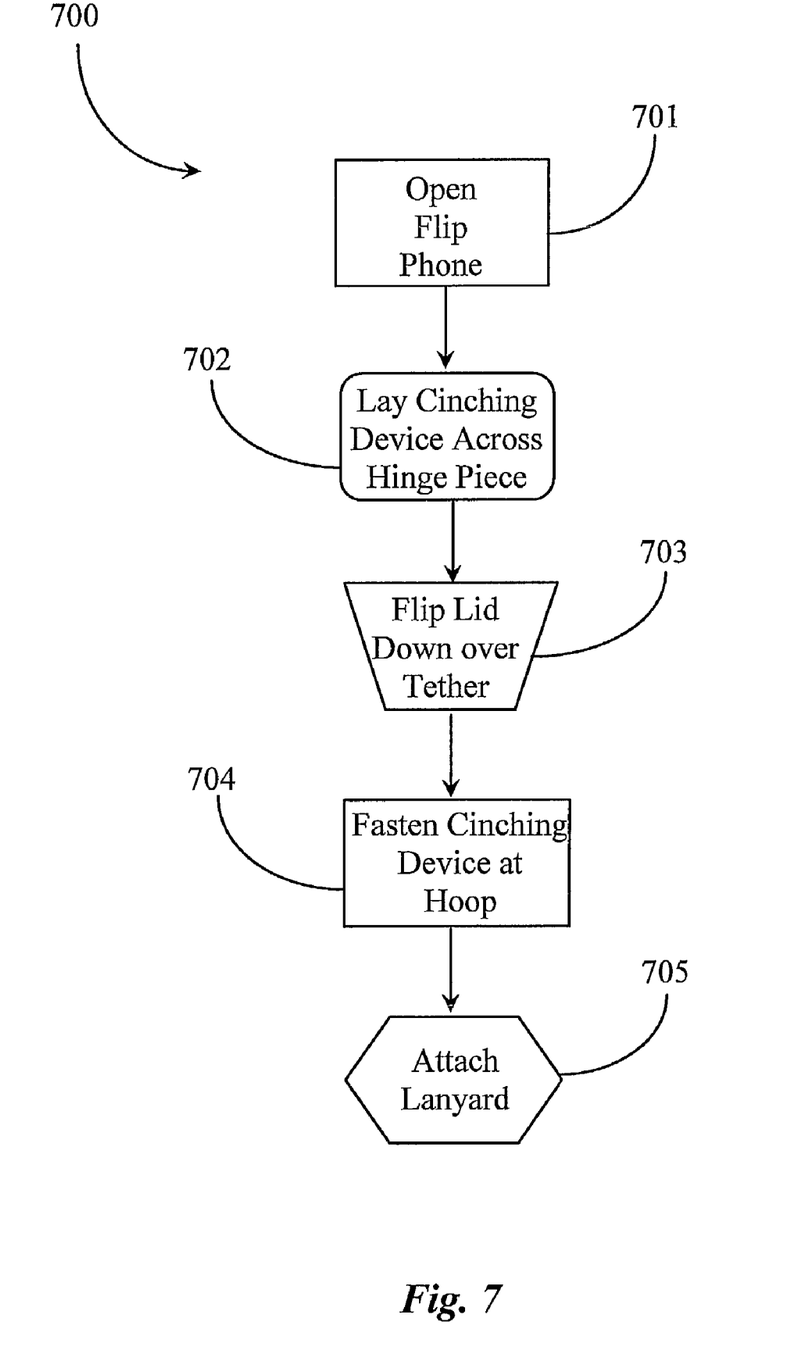
FIG. 7 is a process flow chart illustrating steps for suspending a flip phone using the cinching device of FIG. 5.

FIG. 7 is a process flow chart illustrating steps for suspending a flip phone using the cinching device of FIG. 5. At step 700, a user opens the flip phone similar to phone 200 described further above. At step 702, the cinching device is laid across the hinge piece connecting the phone lid to the phone base.

At step 703, the user closes the phone lid over the tether leaving the hoop and bar of the cinching device exposed at either end of the hinge. At step 704, the user grasps the bar and hoop and fastens them together affecting the cinch. At step 705, the user may attach the lanyard to the hoop of the cinching device to suspend the phone such as around the user's neck, for example.

It will be apparent to one with skill in the art that the system of the invention may be provided using some or all of the mentioned features and components without departing from the spirit and scope of the present invention. It will also be apparent to the skilled artisan that the embodiments described above are exemplary of inventions that may have far greater scope than any of the singular descriptions. There may be many alterations made in the descriptions without departing from the spirit and scope of the present invention. For example the system may be used with other hand-held devices, such as personal digital assistants, smart phones, and the like.

What is claimed is:

1. A carrier for a cellular flip-phone having a base with a keypad, comprising:
   a rigid support panel having a length and a width, a front side and a back side, and an opening near one end of the length for attaching to a lanyard;
   an elongate strip of flexible, pliable material having two fold seams dividing the strip into a first, a second, and a third section, the second being a middle section, each section having a width substantially the width of the rigid support panel, the first section joined by adhesive to the back of the rigid support panel;
   a pliable, transparent window substantially centered in the middle section;
   a first fastener mechanism implemented on a surface of the third section; and
   a second fastener mechanism implemented on an opposite surface of the first section, facing away from the rigid panel;
   wherein placing a base of a cellular flip-phone on the front side of the rigid panel and wrapping the elongate strip around the phone base with the third section overlying the back side of the rigid panel places the transparent window over the keypad, and aligns the first and second fastener mechanisms to be joined to secure the flip phone in the carrier.

2. The carrier of claim 1 wherein the first and second fasteners comprise a hook and loop fastener system.

3. The carrier of claim 1 wherein the first and second fasteners comprise a snap fastener system.

4. The system of claim 1, further comprising a lanyard including memory clips folded over the lanyard material.

5. The carrier of claim 1, wherein the lanyard is adjustable to lengthen or shorten the lanyard.

6. The carrier of claim 1, further comprising one or more pockets on the backside of the carrier of a size for storing one or more items including one or more of credit cards, bank cards, identity cards, or driver's license.

7. The carrier of claim 1 further comprising one or more pockets on the frontside of the rigid panel for storing one or more items including one or more of credit cards, bank cards, identity cards, or driver's license, such that the pocket is enclosed when a phone is in the carrier.

* * * * *